(12) United States Patent
Okuda et al.

(10) Patent No.: US 7,184,552 B2
(45) Date of Patent: Feb. 27, 2007

(54) INFORMATION REPRODUCING APPARATUS

(75) Inventors: Nobukatsu Okuda, Neyagawa (JP); Takanori Okada, Toyonaka (JP); Shuichi Yoshida, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 747 days.

(21) Appl. No.: 10/606,997

(22) Filed: Jun. 27, 2003

(65) Prior Publication Data

US 2004/0117645 A1   Jun. 17, 2004

(30) Foreign Application Priority Data

Jun. 28, 2002   (JP)   ............... 2002-189322

(51) Int. Cl.
*H04N 7/167*   (2006.01)
(52) U.S. Cl. ............... 380/212; 380/200; 380/201
(58) Field of Classification Search ........ 380/201–204, 380/212, 236, 237, 217, 221; 713/189; 705/57–59; 726/26, 31
See application file for complete search history.

(56) References Cited

U.S. PATENT DOCUMENTS

| 5,652,824 | A | 7/1997 | Hirayama et al. |
| 5,825,731 | A | 10/1998 | Yokota |
| 6,760,918 | B2 * | 7/2004 | Rodriguez et al. .......... 725/134 |
| 6,768,774 | B1 * | 7/2004 | MacInnis et al. ...... 375/240.15 |
| 6,768,863 | B2 * | 7/2004 | Ando et al. ................... 386/95 |

FOREIGN PATENT DOCUMENTS

| JP | 8-31096 | 2/1996 |
| JP | 9-161375 | 6/1997 |
| JP | 10-174029 | 6/1998 |
| JP | 11-164257 | 6/1999 |
| WO | 03/030018 | 4/2003 |

* cited by examiner

*Primary Examiner*—Hosuk Song
(74) *Attorney, Agent, or Firm*—Wenderoth, Lind & Ponack, L.L.P.

(57) ABSTRACT

An information reproducing apparatus reproduces one type of information (for example, video information) in synchronous with a plurality of channels of other type of information (for example, audio information) with high copyright protection, and includes a decryption section that decrypts multiplexed stream reproduced from a recording medium, a stream analyzer that analyzes the multiplexed stream which is decrypted to detect first information (video information) contained in the multiplexed stream, a stream conversion section that alters the first information contained in the multiplexed stream which is decrypted, based on an analysis result by the analyzer. The multiplexed stream with altered video information is distributed to second to n-th stream decoders (for example, for achieving a multilingual system).

24 Claims, 6 Drawing Sheets

INFORMATION REPRODUCING APPARATUS

BACKGROUND OF THE INVENTION

1. Field of the Invention

The present invention relates to an information reproducing apparatus, and more particularly to an apparatus which can realize a system operable to reproduce one type of information along with a plurality of channels of the other type of information at the same time, for example, a multilingual system operable to reproduce a video and a plurality channels of audio at the same time.

2. Related Art

In recent years, a DVD has been widely spread and a video and audio reproducing system using the DVD has been introduced into an aircraft or a museum where there is a situation in which a large audience can enjoy the same video picture. In this situation, each audience does not always understand the same language.

Meanwhile, in the DVD, according to a DVD-Video standard, one stream ("multiplexed stream") is recorded as one set of program, in which one channel of video stream, plural channels (up to eight channels) of audio streams corresponding to the video stream, and plural channels (up to thirty-two channels) of sub-picture streams are multiplexed. Thus, it is possible to introduce the DVD system as the multilingual system which can supply the audio corresponding to the language that each audience can understand in the aforementioned situation.

Furthermore, as for the use in the aircraft, a movie which has not been yet played at movie theaters is sometimes played. In this case, there has been strongly demanded a system that is implemented with a copyright protection which can prevent illegal distribution of contents of the movie before release, or trace the source of the distribution even if the contents are illegally distributed.

As a basic idea of the copyright protection, the following method is generally used. In order to prevent the contents from being illegally distributed, the contents are encrypted, and video data to be reproduced is embedded with reproduced date and time, a reproduced media ID, a device ID for reproduction and a content ID containing copyright information such as a title, a producer or the like by digital watermarking and so on which enables the source of the illegal distribution to be traced.

Conventionally, as the video and audio reproducing apparatus implementing the multilingual system using the DVD, the system disclosed in Japanese Patent Laid-Open Publication No. 11-164257 or 8-31096 for example is known. The Publication No. 11-164257 discloses a multilingual system which includes a plurality of audio decoders arranged in parallel each extracting an audio stream of the corresponding language from audio data in presentation data produced from the DVD with reference to navigation data produced from the DVD and decoding the respective audio stream. The Publication No. 8-31096 discloses that audio data is distributed according to stream ID of audio data, decoded by the corresponding decoder, and output to a predetermined signal channel.

In general, the present video and audio reproducing apparatus using the DVD is configured so that one audio selected from the plural audios are output to one video. An AV decoder which include a plurality of decoders as one chip so as to output a plurality channels of audio signal to one video signal at the same time has not been generally used. Therefore, the aforementioned multilingual system is achieved by arranging in parallel a plurality of widely-spread and commercially available inexpensive AV decoders each having one video decoder and one audio decoder.

FIG. 6 illustrates a configuration of a conventional audio and video reproducing apparatus (AV reproducing apparatus) which allows the multilingual system to have the aforementioned copyright protection function.

A stream data reproducing section 100 reproduces a multiplexed stream in which compressed video information and a plurality of channels (first to n-th channel (n is a natural number)) of compressed audio information are multiplexed.

Since the multiplexed stream reproduced by the stream data reproducing section 100 has been encrypted (encryption such as Triple-DES) to protect a copyright, a decryption section 101 decrypts the cipher applied to the multiplexed stream reproduced by the stream data reproducing section 100.

A first stream decoder (AV decoder) 102 decompresses the decrypted multiplexed stream.

A video management information embedding section 103 embeds reproduced date and time, a disc ID, a device ID, a content ID and the like in video data extended by the first stream decoder 102.

A video output section 104 generates a reproduction video signal from the video data embedded with the video management information. The reproduction video signal is output to the outside through a video output terminal 105.

A first audio output section 106 generates a reproduction audio signal based on the first audio data decompressed by the first stream decoder 102. The reproduction audio signal is output to the outside through an audio output terminal 107.

Second to n-th stream decoders 108 to 110 decompress the multiplexed stream input to the first stream decoder 102 in the same manner as that of the first stream decoder 102. Second to n-th audio output sections 111 to 113 generate reproduction audio signals according to the second to n-th audio data decompressed by the second to n-th stream decoders 108 to 110, respectively. Each reproduction audio signal is output to the outside through each of audio output terminals 114 to 116.

By user's selecting any one of the first to n-th audio output terminals 107 and 114 to 116, the audio regarding the language which the user selects and can understand is supplied to a headphone or the like of the user.

According to the conventional AV reproducing apparatus having the above configuration, during audio and video reproducing operation, the multiplexed stream decoded by the decryption section 101 in which video and audio are multiplexed is equally fed to all of the first to n-th stream decoders 102 and 108 to 110. In other words, the multiplexed stream which is in unprotected state after the decryption flows on all data bus lines connected to the second to n-th stream decoders 108 to 110. The data flow shown by arrows shown by thick lines in FIG. 6 is the multiplexed stream which is in the unprotected state after the decryption. Since the multiplexed stream in unprotected state flows on all the data bus lines connected to the second to n-th stream decoders 108 to 110, a risk of being illegally copied by extracting the multiplexed stream from these data bus lines can increase. Thus, it is necessary to protect all of the data bus lines by molding them with resin or the like in a circuit substrate of the reproducing apparatus.

As described above, it has been demanded to improve the security to protect the copyright further solidly regarding the branch of the decrypted multiplexed stream.

SUMMARY OF THE INVENTION

The present invention is made in view of the above problems and it is an object of the present invention to provide an information reproducing apparatus capable of improving the security of copyright protection.

In a first aspect of the invention, provided is an information reproducing apparatus including, a reproducing section operable to reproduce multiplexed data in which first information which is and a plurality of channels of second information which is compressed and encrypted are multiplexed, the second information being reproduced in synchronization with the first information, a decryption section operable to decrypt the reproduced data from the reproducing section, a first decoder operable to decompress the decrypted data from the decryption section, an analyzer operable to analyze the decrypted data from the decryption section to detect the first information, a conversion section operable to alter at least a part of the first information contained in the decrypted data from the decryption section based on an analysis result by the analyzer, and second to n-th (n is a natural number, n>1) decoders operable to receive the altered data from the conversion section and decompress the respective channels of second information.

In a second aspect of the invention, provided is an information reproducing apparatus including a reproducing section operable to reproduce a multiplexed stream in which compressed and encrypted video information and a plurality of channels of compressed and encrypted audio information are multiplexed, a decryption section operable to decrypt the multiplexed stream reproduced by the reproducing section, a first decoder operable to decompress the video information and one channel of audio information contained in the multiplexed stream decrypted by the decryption section, a management information embedding section operable to embed video management information into the video data decompressed by the first decoder, a video output section operable to generate a reproduction video signal from the video data embedded with the video management information by the management information embedding section, a first audio output section operable to generate a reproduction audio signal from the audio data decompressed by the first decoder, a stream analyzer operable to analyze the multiplexed stream decrypted by the decryption section to detect the video information, a stream conversion section operable to alter at least a part of the video information contained in the multiplexed stream decrypted by the decryption section based on an analysis result from the stream analyzer, second to n-th (n is a natural number, n>1) decoders operable to receive the altered multiplexed stream from the conversion section and decompress the respective channels of audio information, and second to n-th audio output sections operable to generate reproduction audio signals from audio data decompressed by the corresponding decoders.

The information reproducing apparatus may further include two switches.

The first switch may switch a data path such that the reproduced data from the reproducing section bypasses the decryption section and is input to the first decoder when a predetermined control signal is input, otherwise, the reproduced data from the reproducing section is input to the decryption section. The second switch may switch a data path such that the reproduced data from the reproducing section is input to each of second to n-th decoders when the control signal is input, otherwise, the data from the stream conversion section is input to each of second to n-th decoders.

According to the information reproducing apparatus of the present invention, the decrypted multiplexed stream to be distributed for a multilingual function is distributed to decoders after the video information contained therein is changed or altered. Thus, the number of bus lines through which the decrypted data with low protection flows can be reduced. As a result, there can be provided the information reproducing apparatus which can prevent an illegal copy by extracting data during distribution and improve security for copyright protection.

DESCRIPTION OF THE PREFERRED EMBODIMENTS

With reference to accompanied drawings, an information reproducing apparatus according to the present invention will be described. In the following description, an audio and video reproducing apparatus is exemplarily described, which achieves a multilingual system in which one channel of video information and a plurality of channels of audio information can be simultaneously reproduced.

First Embodiment

Figure 1:
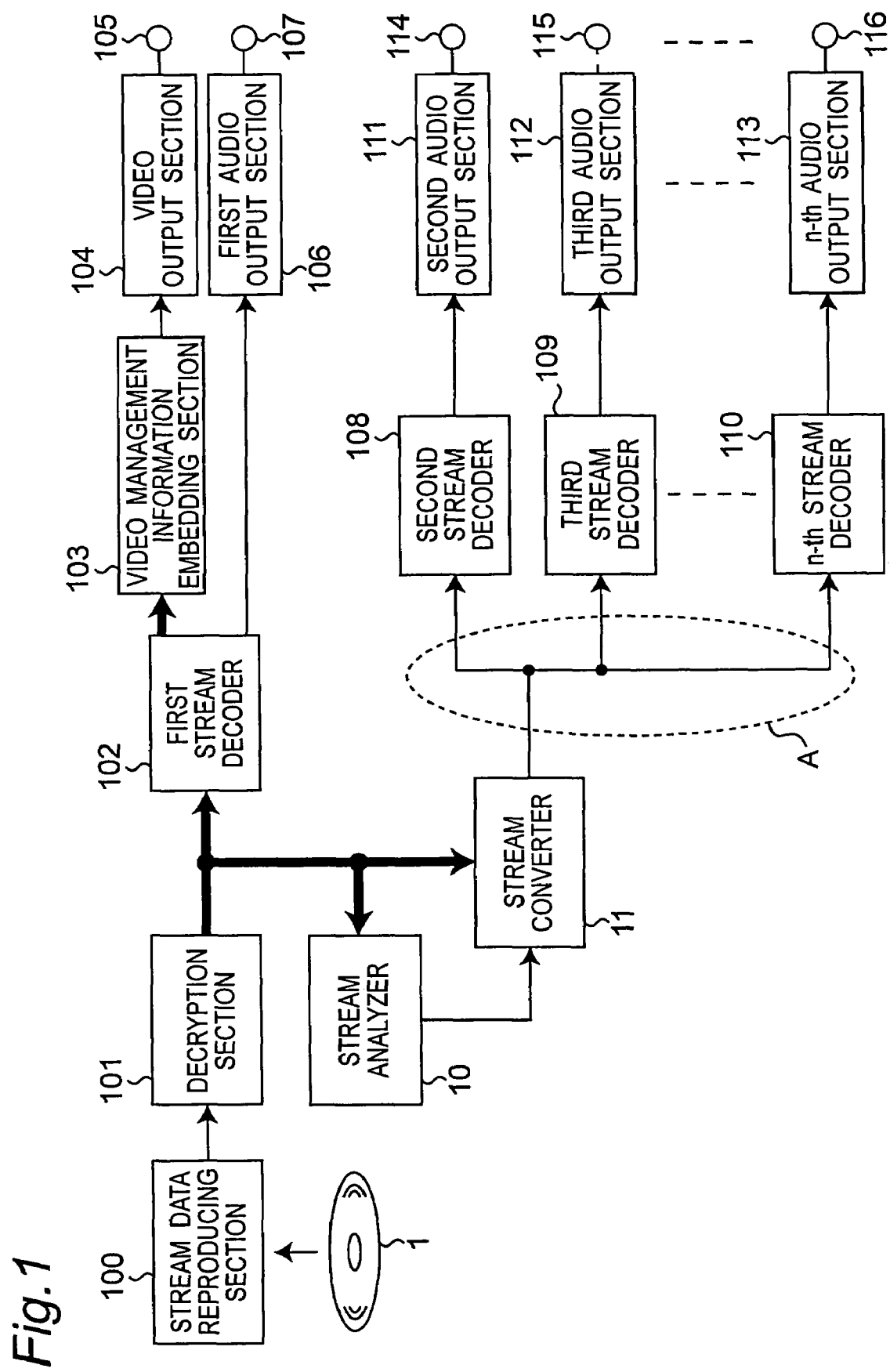
FIG. 1 is a view showing a configuration of an audio and video reproducing apparatus according to a first embodiment of the present invention.

FIG. 1 illustrates a configuration of an audio and video reproducing apparatus (AV reproducing apparatus) according to the present invention. It should be noted that arrows shown by thick lines in FIG. 1 show data bus lines through which data with low protection which is not encrypted could flow.

The AV reproducing apparatus includes a stream data reproducing section 100 for reproducing a stream in which audio and video information is multiplexed from a recording medium 1 such as a DVD, a decryption section 101 for decrypting the cipher applied to the reproduced stream, a stream analyzer 10 for analyzing the decrypted stream, a stream converter 11 for altering (converting) video information according to an analysis result, first to n-th stream decoders 102 and 108 to 110 for decoding the reproduced stream, a video management information embedding section 103 for embedding management information for copyright protection into the reproduced stream, a video output section 104 for generating an analog reproduction video signal from the reproduced stream, and first to n-th audio output sections 106 and 111 to 113 for generating first to n-th channels of analog reproduction audio signals from the reproduced stream.

Furthermore, the AV reproducing apparatus includes a video output terminal 105 for outputting a reproduction video signal and audio output terminals 107 and 114 to 116 for outputting the first to n-th channels of analog audio reproduction signals, respectively.

Operations of the thus constituted AV reproducing apparatus will be described hereinafter. It should be noted that operations during reproduction using a DVD as an example of a recording medium will be described hereinafter.

First, the description is made to audio and video information recorded in the DVD to be reproduced. In the DVD, a stream (multiplexed stream) is recorded, in which video information and first to n-th (n is a natural number and at most 8 for the DVD) channels of audio information reproduced in synchronization with the video information are compressed and multiplexed. The multiplexed stream is encrypted for copyright protection for example by Triple-DES encryption.

Figure 2:
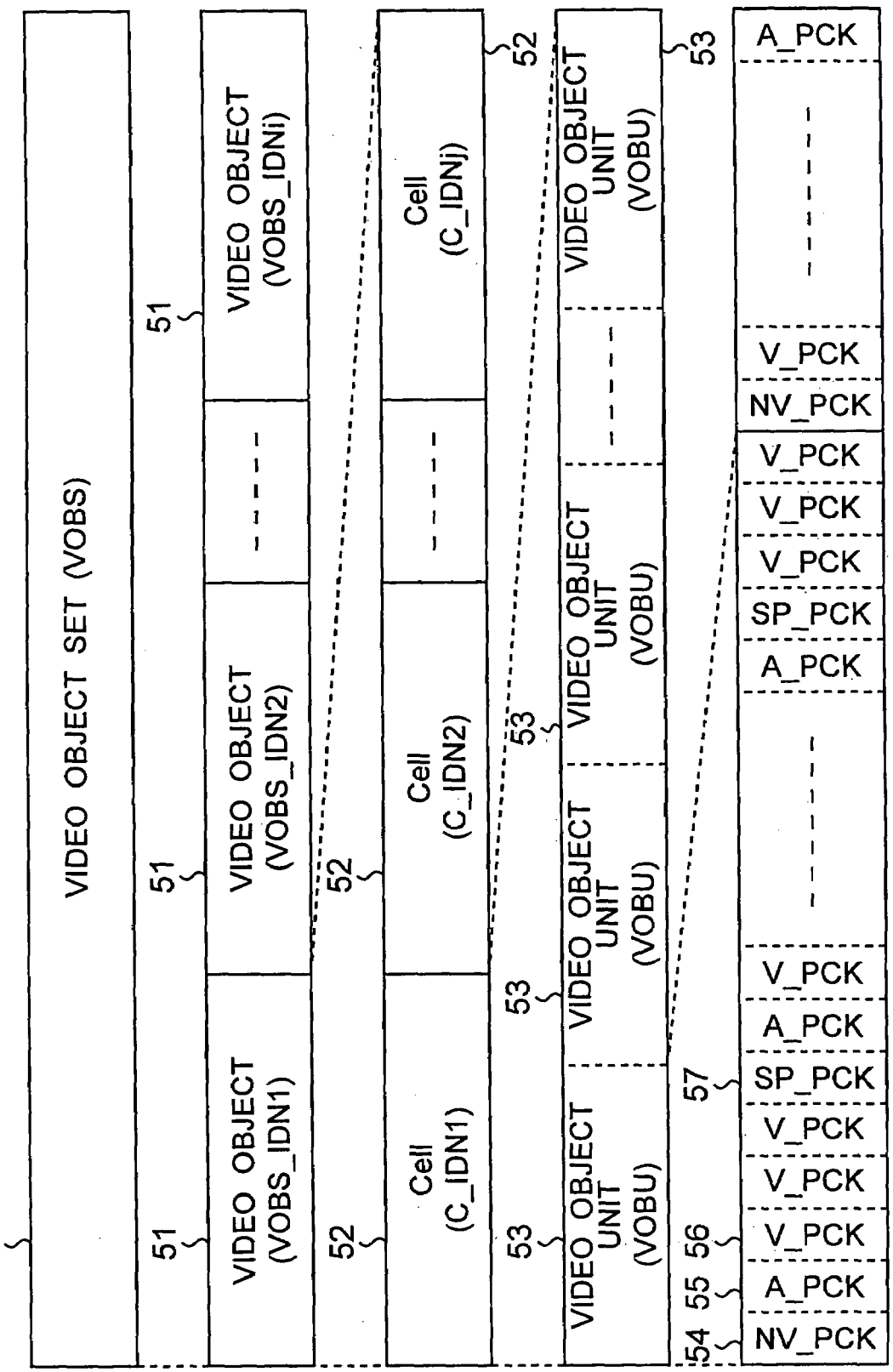
FIG. 2 illustrates a data structure of a video object set (VOBS)

As shown in FIG. 2, one unit of content such as a movie is recorded as a Video Object Set (VOBS) 50 in the DVD.

The VOBS 50 includes a plurality of video objects (VOB) 51. An ID number (IDNi (i is an integer)) allotted to each VOB 51 means the i-th of VOBs.

The DVD is configured such that, to achieve a multi-story function in which one movie can be seen in a plurality of story developments, each VOB provides the different story developments.

The VOB 51 is composed of a plurality of cells 52. ID number (IDNj (j is an integer)) allotted to each cell 52 indicates the j-th of cells.

The cell 52 is a unit such as one scene in a movie, for example. In other words, a combination of the scenes is the VOB 51, and the aforementioned multi-story function can be realized by a different combination. The cell 52 is composed of a plurality of video object units (VOBUs) 53.

One VOBU 53 always starts from one navigation pack (NV_PCK) 54, and includes a plurality of audio packs (A_PCK) 55, a plurality of video packs (V_PCK) 56 and a plurality of sub-picture packs (SP_PCK) 57.

The navigation pack 54 is mainly used as control data for controlling reproduction and display of data in the VOBU 53 to which the navigation pack 54 belongs and control data for searching data in the VOBU 53.

The video pack 56 is main video information and compressed according to a standard such as MPEG. The sub-picture pack 57 is sub-video information having subsidiary contents to the main video information such as superimposed title. The audio pack 55 is audio information.

Thus, the video stream, sub-picture stream and audio stream are multiplexed with a pack as one unit, respectively.

Then, a pack structure will be described. The main video information is recorded in a data region of the DVD in a pack sequence.

Each pack has a length of 2048 bytes regardless of its type. The video pack, sub-picture pack and audio pack which constitute presentation data include 14 bytes of pack header and one or more packets which fill the remaining 2034 bytes. The pack length is adjusted so as to be always 2048 bytes in such a manner that when the number of adjusting data is less than 7 bites, a stuffing bite (FFh) in a packet header of the packet is inserted, or when the number of adjusting data is not less than 7 bytes, a padding packet is inserted at the end of the pack. It should be noted that the padding packet contains a packet start code (4 bytes) including a head start code (000001h) and a padding stream ID (BEh), a packet length (2 bytes), and padding bytes (FFh) having a data length necessary for adjusting the pack length.

The pack header 62 contains 4 bytes of pack start code (000001BAh), SCR (System Clock Reference, which includes two bits of identification code for MPEG 1 (00b) and MPEG 2 (01b) at its head of 6 bytes) for setting and correcting an STC (System Time Clock) which is a reference synchronized signal in the AV decoder and a reference time, multiplexing rate (6 bytes) of the multiplexed stream represented by a unit of 50 bytes/sec, and a stuffing bite length (1 bite: Regarding the DVD, its value is fixed to F8h since there is no stuffing bite.).

Figure 3:
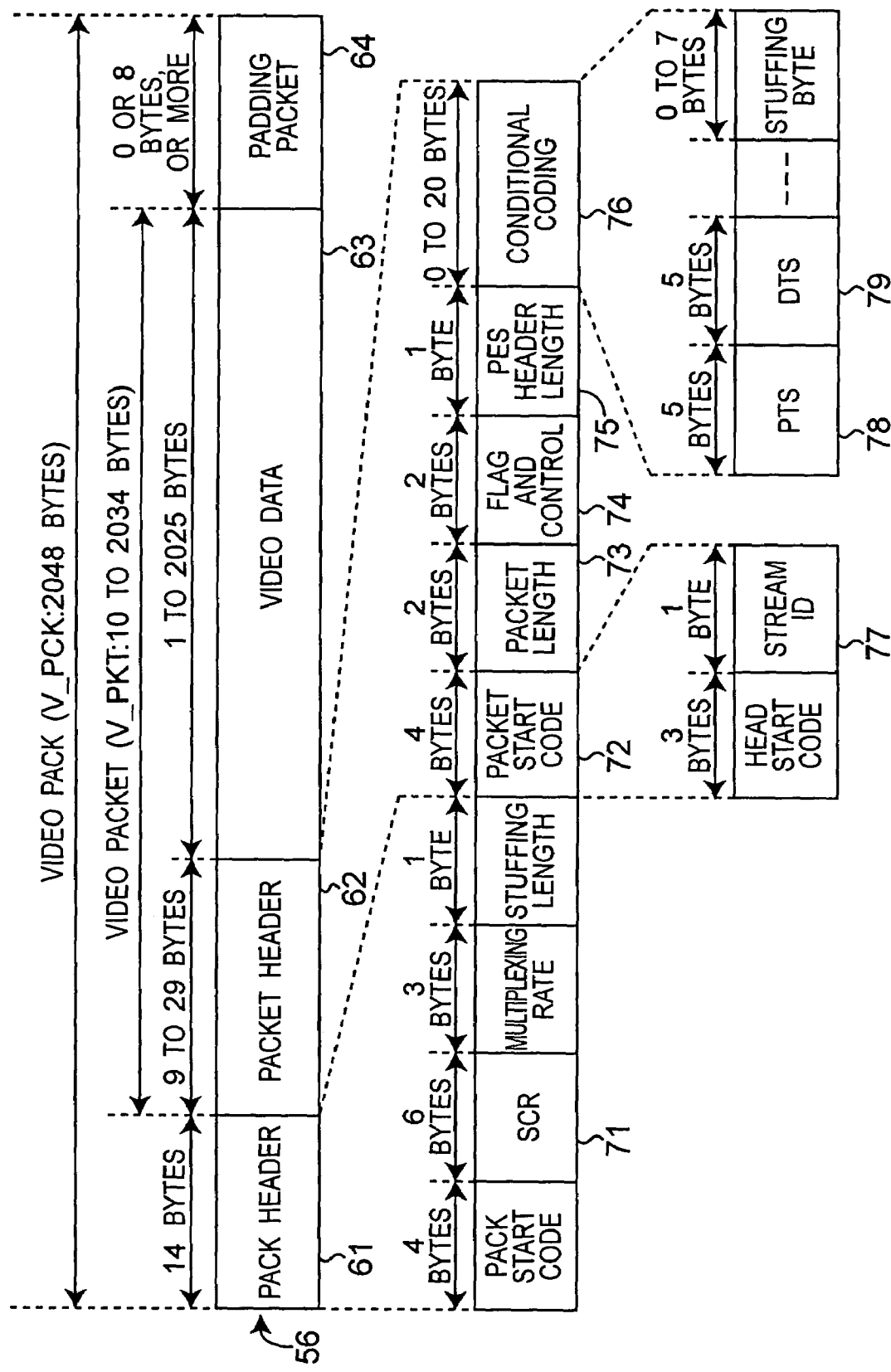
FIG. 3 illustrates a data structure of a video pack (V_PCK)

FIG. 3 shows a structure of the video pack 56. The video pack 56 includes a pack header 61 and 2034 or less bytes of the video packet (V_PKT). In a case where the pack length is less than 2048 bytes, the length is adjusted by the aforementioned method.

The video packet has fields of a packet header 62 and video data 63. The packet header 62 has the following fields:

a packet start code (4 bytes) 72, which includes a head start code (3 bytes: 000001h) and a stream ID of the video (1 byte: E0h);

a packet length (2 bytes) 73, which is a data length of the packet following the present field and does not contain 6 bytes of the packet start code and the packet length;

a flag and control (2 bytes) 74, which indicates identification code in two bits for MPEG 1 (other than 10b) and MPEG 2 (10b), and presence/absence of conditional coding, and the like;

a PES header length (1 byte) 75, which is a data length of the packet header following the above field and represent the data length of the conditional coding; and a conditional coding (0 to 20 bytes) 76, in which conditions of packet such as time management information PTS (Presentation Time Stamp) 78 of a reproduced output and time management information DTS (Decoding Time Stamp) 79 for decompression, addition of those information to the packet being defined according to the packet generation rule. The conditional coding has a variable data length.

The video data (1 to 2025 bytes) 63 is an elementary stream divided every packet.

The AV reproducing apparatus operates as follows.

The stream data reproducing section 100 is a DVD drive and reproduces from the DVD a multiplexed stream in which compressed video information and n-channel of compressed audio information are multiplexed.

The decryption section 101 decrypts the cipher applied to the multiplexed stream which is reproduced by the stream data reproducing section 100. More specifically, the decryption section 101 decrypts the cipher made for copyright protection in a payload (for example, video data in case of the video packet) in the packet.

The first stream decoder 102 decompresses the multiplexed stream decrypted by the decryption section 101. More specifically, the first stream decoder 102 refers to navigation data in the multiplexed stream and searches presentation data (video/audio/sub-picture) according to its instruction to decompress the video data compressed by MPEG and a predetermined channel of audio information (the first audio data). The first stream decoder 102 can be achieved by for example an inexpensive commercially available and widely-distributed AV decoder which includes one video decoder and one audio decoder (the same goes for other stream decoders 108 to 110).

The video management information embedding section 103 embeds video management information such as reproduced date and time, a disc ID, a device ID, a content ID in the video information decompressed by the first stream decoder 102.

The video output section 104 encodes and DA converts the video information embedded with the video management information and outputs it as a reproduction video signal such as NTSC/PAL or the like to the outside through the video output terminal 105. The video output terminal 105 is connected with a display device such as a monitor.

The first audio output section 106 outputs the reproduction audio signal obtained by DA converting the first audio data which is decompressed by the first stream decoder 102 to the outside through the audio output terminal 107. The audio output terminal 107 is connected with a headphone or the like (the same goes for the other audio output terminals 114 to 116).

The stream analyzer 10 analyzes the multiplexed stream fed into the first stream decoder 102 and detects the video information. The stream converter 11 alters the video information in the multiplexed stream fed into the first stream decoder 102 based on an analysis result of the stream analyzer 10. These operations will be described in detail later.

The second to n-th stream decoders 108 to 110 decompress the multiplexed stream in which the video information is altered by the stream converter 11. Especially, the second to n-th stream decoders 108 to 110 decompresses the respective predetermined channels of audio information (the second to n-th audio data) in the multiplexed stream. The second to n-th audio output sections 111 to 113 DA-convert the second to n-th audio data decompressed by the second to n-th stream decoder 108 to 110, respectively to generate reproduction audio signals and outputs them to the outside through the audio output terminals 114 to 116.

From the plural audio outputs for one video output, the language a user can understand is selected by switching the first to n-th audio output terminals 107 and 114 to 116 and supplied to a headphone of the user or the like.

Operations of the stream analyzer 10 and the stream converter 11 will be described in detail.

The stream analyzer 10 analyzes the output from the decryption section 101 to output the analysis result to the stream converter 11. The stream converter 11 alters the video information in the multiplexed stream output from the decryption section 101 based on the analysis result by the stream analyzer 10.

More specifically, the stream analyzer 10 detects the pack start code 70 described in the pack header 62 contained at the head of the pack, and counts the number of bytes of data in the pack from the detected point to specify the position of the packet start code 72 in the packet header. Then, the analyzer 10 refers to the packet start code 72 to obtain stream ID 77 described therein and detects based on the stream ID 77 whether the present pack is a video pack storing the video information to be altered.

When the video pack storing video information to be altered is detected, the stream converter 11 refers to a PES header length 75 described in the packet header 62 and calculates the head of the video data 63 which changes according to the data length of the conditional coding 76. Knowledge of the head of the video data 63 allows it to be determined that the video data is stored thereinafter. In other words, the stream converter 11 can recognize the data length of the video data to be altered by referring to the PES header length 75. The stream converter 11 replaces all data from the head of the video data 63 to the end of the video pack with data which is uncorrelated to the original video data such as the "FFh" used in the stuffing bite or the padding bite which should be discarded by the stream decoders 108 to 110, for example.

The video data contains collateral information required for decompressing the compressed video information and the video information itself. Replacing or disabling those information with the uncorrelated data to the original data causes the video information not to be correctly decompressed. As a result, the video cannot be correctly reproduced. In other words, since all of the video data in the video pack is replaced, the original video data cannot be reproduced any more. Consequently, the copyright can be strongly protected.

Here, the collateral information in the video data includes quantization matrix data, motion vector information, and so on. The quantization matrix data is a weight for applying different sensitivities to respective places of DCT coefficients so as to change the roughness of quantization for each frequency of DCT (Discrete Cosine Transform). The motion vector information represents a moving distance of a compared block in a reference screen. The video information itself in the video data means DC coefficient, DC differential value, AC coefficient or the like in the DCT block which is a unit of compression for performing DCT operation. The DCT is an orthogonal transformation for converting image data to frequency component.

As described above, according to the present embodiment, the video information in the stream to be input to the second to n-th stream decoders 108 to 110 for multilingual function is altered by the stream converter 11. Therefore, since the stream having the altered video information flows on data bus lines between the stream converter 11 and the second to n-th stream decoders 108 to 110, even if the stream on these data bus lines is extracted, the video information cannot be reproduced, so that sufficient protection is implemented. In other words, according to the present embodiment, the multiplexed stream with low protection after decryption flows only on the data bus lines shown by thick solid lines in FIG. 1, so that the number of data bus lines on which the multiplexed stream with low protection after decryption can be reduced. It is sufficient to protect at least this portion with resin mold or the like, and thus the security can be improved as compared with the prior art.

Although the second to n-th stream decoders 108 to 110 cannot decode and output the correct reproduction video signal, since time information (time stamp (PTS, DTS), time reference value (SCR)) existing in the collateral information of both streams of the video and audio information is not altered, the video and audio can be correctly synchronized based on that information. As a result, the reproduced video signal from the video output terminal 105 and the reproduced audio signal from the first to n-th audio output terminals 107 and 114 to 116 can be always synchronized correctly.

Although the video data is replaced with "FFh" according to the present embodiment, it may be replaced with any data which is uncorrelated to the original video data such as random data. Furthermore, it may be replaced with the video management information such as the reproduced date and time, the disc ID, the device ID, the content ID or the like which are embedded by the video management information embedding section 103. This is especially effective in tracking the destination of an illegal copy. If the reproduced video information cannot be substantially used, only a part of data may be replaced instead of all of the video data 63.

Although the video data in the video pack is altered according to the present embodiment, the sub-picture data in the sub-picture pack or the audio data in the audio pack can be altered in the same way.

The first to n-th stream decoders 102 and 108 to 110 may decode different channels of audio information or all or some of the stream decoders 102 and 108 to 110 may reproduce the same channel of audio signal. When at least a part of the stream decoders 102 and 108 to 110 decodes and outputs the same channel of the audio information, the user can select the best audio signal in its reproduced state among the plural audio signals for a desired channel.

Although description is made of the multiplexed stream at a constant bit rate using the DVD system according to the present embodiment (the following embodiments also), it is not limited to the multiplexed stream at the constant bit rate. The present invention may be applied to multiplexed data of the video information and audio information regardless of its bit rate.

Although the description is made of the multilingual system which reproduces one channel video signal and the plural channels of audio signal at the same time according to the present embodiment (the following embodiments also), the present invention, for example, can also be applied to a system which reproduces one channel audio signal and plural channels of video signals at the same time. In this case, the video information and the audio information are replaced with each other. In addition, it is understood that the invention also may be applicable in a case where there are plural channels of video and plural channels of audio.

Although the description is made of the data stream which is transmitted in accordance with the processed order according to the present embodiment (the following embodiments also), the present invention is not limited to the data stream and can be applied to general data which don't have concept of time flow.

Although the description is made of the case where the video information and the audio information are multiplexed according to the present embodiment (the following embodiments also), the present invention is not limited to the above. When there are two types of information in which information of one type is to be reproduced in synchronization with information of the other type which is not required for having higher security than that of one type, it is understood that the present invention will be applicable to those information. There are the following examples as such combination of the information, that is, high-resolution video information (Hi-Vision, for example) and plural channels of low-resolution video information (MPEG video information at low bit rate, for example); and video information and a plurality of channels of character information conveying information in a plurality of different languages.

Second Embodiment

Figure 4:
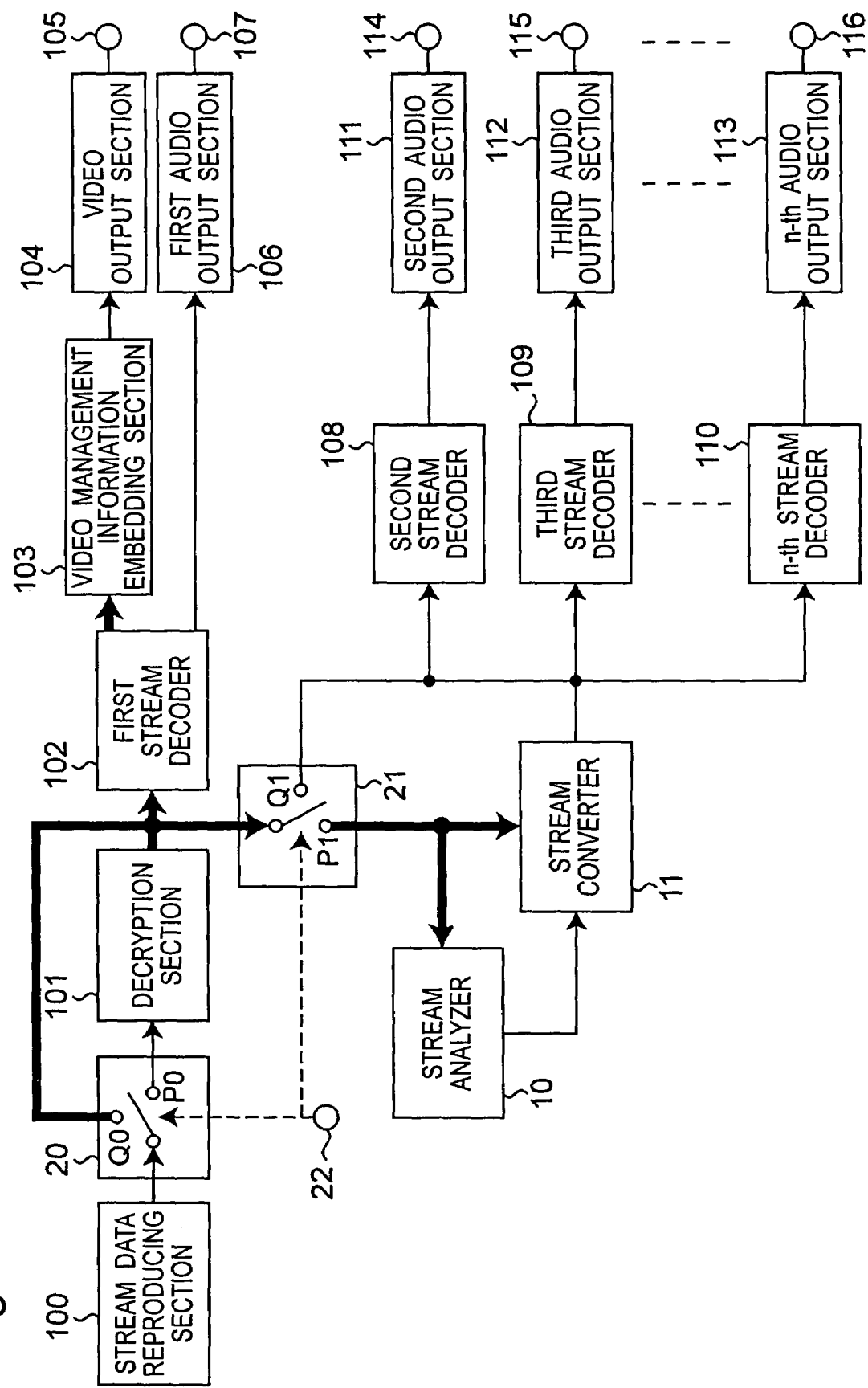
FIG. 4 is a view showing a configuration of an AV reproducing apparatus according to a second embodiment of the present invention.

FIG. 4 illustrates another configuration of an AV reproducing apparatus according to the present invention. According to the present embodiment, in addition to the configuration of the first embodiment, provided are two switches 20 and 21 for switching the stream path. Arrows shown by thick lines in FIG. 4 show data bus lines through which data with low protection which is not encrypted could flow.

The first switch 20 switches the stream path such that a multiplexed stream output from a stream data reproducing section 100 would be input to a decryption section 101 or a first stream decoder 102 and the second switch 21. The first switch 20 switches the stream path such that the multiplexed stream from the stream data reproducing section 100 would bypass or pass the decryption section 101.

The second switch 21 switches the stream path such that the multiplexed stream output from the first switch 20 or the decryption section 101 would be input to second to n-th stream decoders 108 to 110, or a stream analyzer 10 and a stream converter 11. The second switch 21 operates simultaneously with the first switch 20, and when the multiplexed stream from the stream data reproducing section 100 bypasses the decryption section 101, it switches the stream path such that the bypassing multiplexed stream would be directly input to the second to n-th stream decoders 108 to 110.

The first and second switches 20 and 21 are controlled by a control signal input from a control signal input terminal 22.

Description will be made to operations of the thus constituted AV reproducing apparatus according to the present embodiment.

First, description will be made to operations in case that the control signal input terminal 22 receives a control signal for instructing to bypass the decryption section 101 (that is, decryption by the decryption section 101 is not necessary). As such case, there is a case where the multiplexed stream reproduced from the DVD is not encrypted or a case where the reproduced multiplexed stream is encrypted in a encryption method which can not be decrypted by the decryption section 101. At this time, the first switch 20 switches the stream path to connect a contact point Q0 and the second switch 21 switches the stream path to connect a contact point Q1.

The first stream decoder 102 decompresses the multiplexed stream which bypasses the decryption section 101. At this time, when the multiplexed stream reproduced from the stream data reproducing section 100 is applied with CSS scramble and it is necessary to descramble it by the first stream decoder 102, the first stream decoder 102 descrambles the input multiplexed stream and then decompresses the information. In this case, however, the first stream decoder 102 has to be provided with a CSS descrambler.

The second switch 21 switches the stream path such that the multiplexed stream which bypasses the decryption section 101 would bypass the stream analyzer 10 and stream converter 11 according to the control signal input from the control signal input terminal 22.

The second to n-th stream decoders 108 to 110 decompress the information of the multiplexed stream which has bypassed the stream analyzer 10 and stream converter 11.

Next, description will be made to a case where the control signal input terminal 22 receives a control signal for instructing not to bypass the decryption section 101. At this time, the first switch 20 switches the stream path to connect a contact point P0 and the second switch 21 switches the steam path to connect the contact point P1. Operations of the AV reproducing apparatus in this case is the same as those described in the first embodiment.

As described above, according to the present embodiment, the two switches 20 and 21 operate simultaneously to pass/bypass the decryption section 101 in accordance with necessity of decryption. This can provide the AV reproducing apparatus which can flexibly handle reproduction of a commercially available and widely-spread DVD which is not encrypted and does not need decryption for reproduction, or reproduction of a commercially available DVD applied with scramble such as CSS known well as copy protection of the DVD.

Third Embodiment

Figure 5:
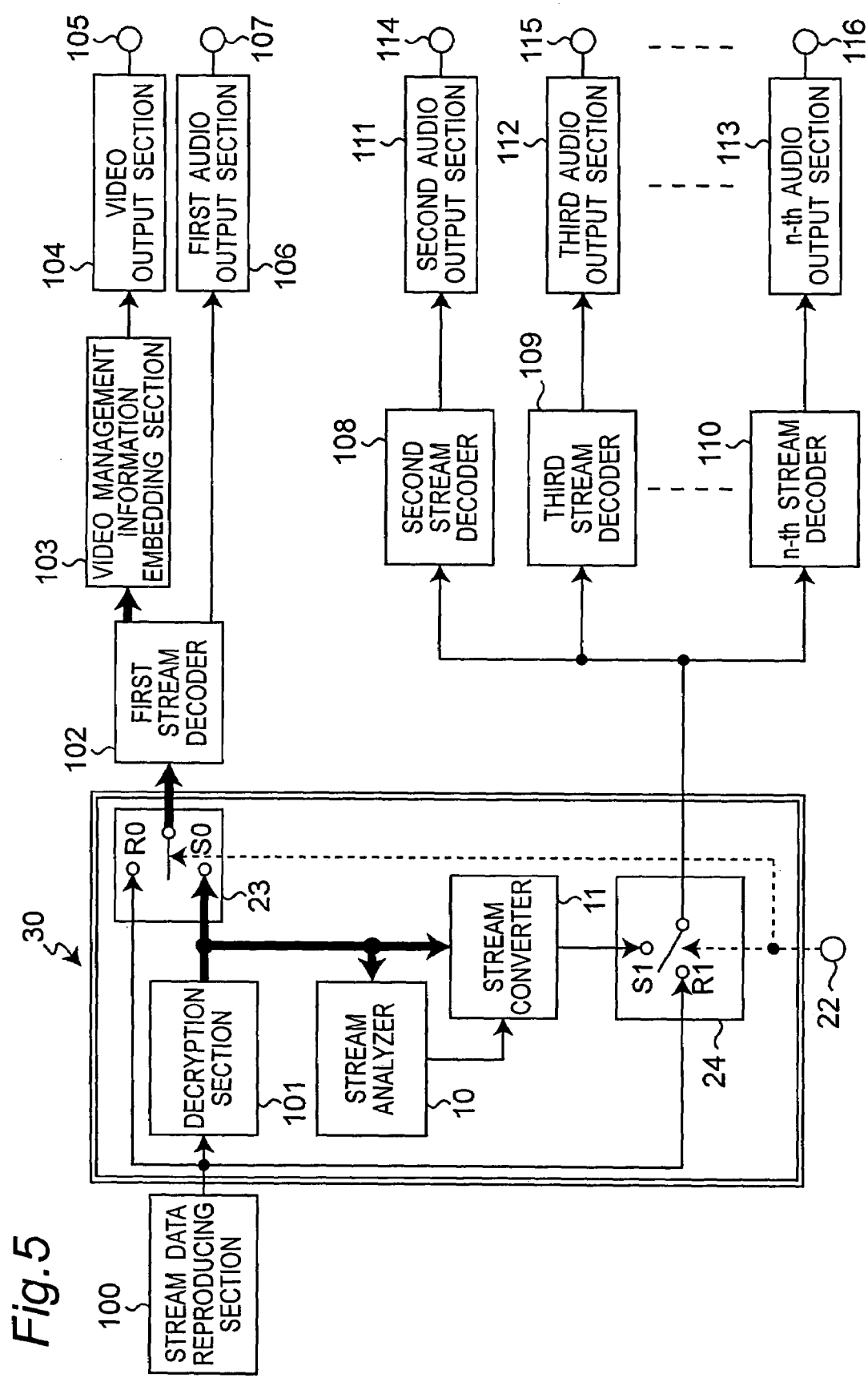
FIG. 5 is a view showing a configuration of an AV reproducing apparatus according to a third embodiment of the present invention.
Figure 6:
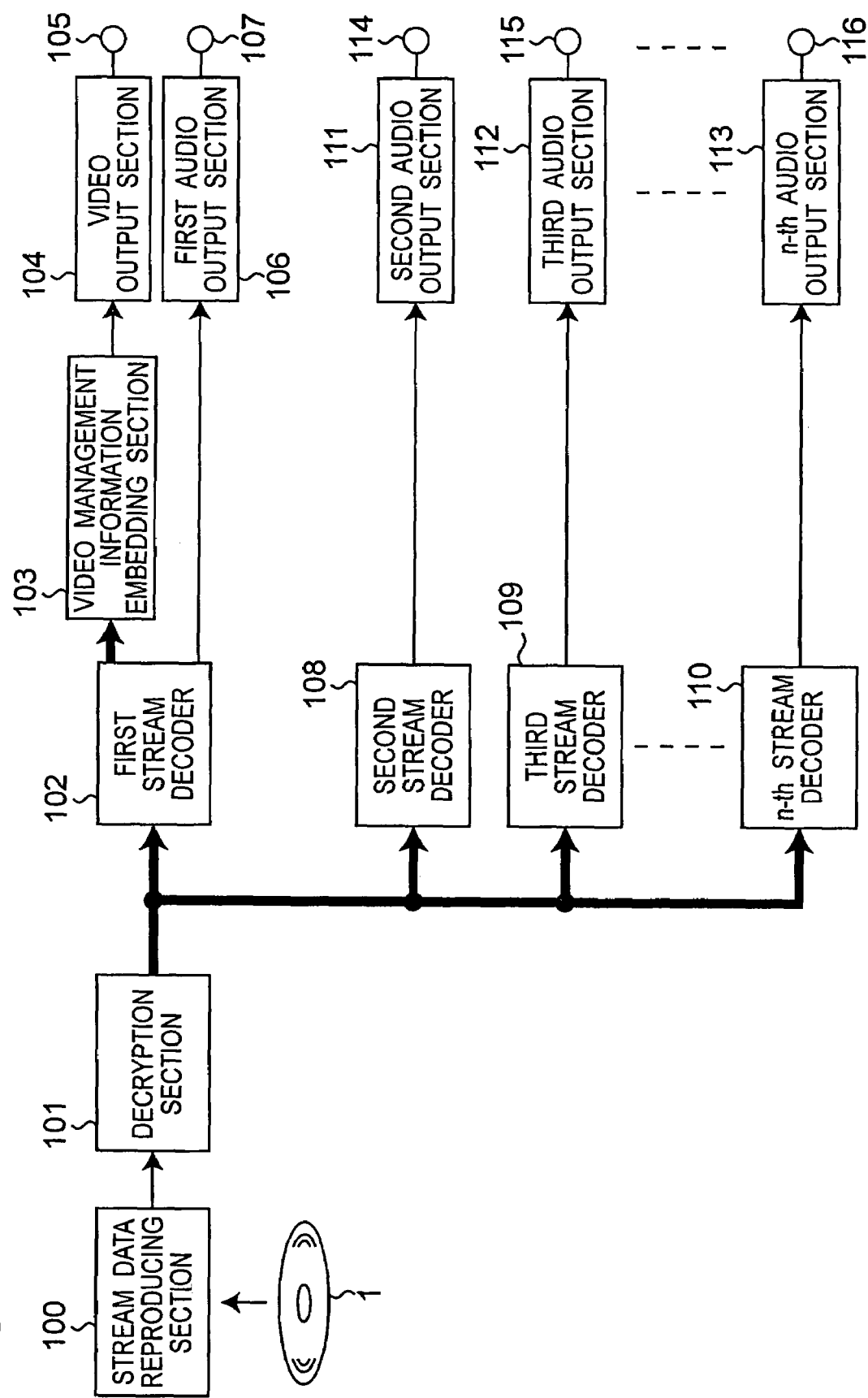
FIG. 6 is a view showing a configuration of a conventional AV reproducing apparatus.

FIG. 5 illustrates still another configuration of an AV reproducing apparatus according to the present invention. According to the present embodiment, in addition to the configuration of the first embodiment, provided are first and second switches 23 and 24 for switching the stream path. In the present embodiment, the first switch 23 is provided so as to be further close to the side of the stream decoder as compared with the second embodiment. Arrows shown by thick lines in FIG. 5 show data bus lines through which data with low protection which is not encrypted could flow.

The first switch 23 selects the stream path such that either a multiplexed stream reproduced from the stream data reproducing section 100 or a multiplexed stream decoded by a decryption section 101 would be input to the first stream decoder 102. That is, the first switch 23 switches the stream path such that the multiplexed stream from the stream data reproducing section 100 would bypass or pass the decryption section 101.

The second switch 24 selects the stream path such that either the multiplexed stream output from the stream data reproducing section 100 or the multiplexed stream of which video information has been altered by the stream converter 11 would be input to second to n-th stream decoders 108 to 110. The second switch 24 operates simultaneously with the first switch 23. When the multiplexed stream from the stream data reproducing section 100 bypasses the decryption section 101, the stream pass is switched such that the multiplexed stream from the stream data reproducing section 100 would be directly input to the second to n-th stream decoders 108 to 110.

The first and second switches 23 and 24 are controlled by a control signal input through a control signal input terminal 22.

Furthermore, as shown by double lines in FIG. 5, the decryption section 101, the stream analyzer 10 and the stream converter 11 are integrated with the first and second switches 23 and 24, resulting in a constitution (30) which cannot to be isolated. The integration is made by packaging as a device such as a gate array or ASIC which cannot be isolated. Integrated each device cannot operate as a single part and data bus lines between devices and control signal lines will not be accessed from the outside.

Description will be made to operations of the thus constituted AV reproducing apparatus according to the present embodiment.

When the multiplexed stream which is not encrypted is reproduced from the DVD, a control signal which does not instruct decryption is input from the terminal 22. According to this control signal, the first switch 23 switches to a contact point R0 and the second switch 24 switches to a contact point R1. As a result, the output from the stream data reproducing section 100 is directly input to the first to n-th stream decoders 102 and 108 to 110.

The first stream decoder 102 decompresses the multiplexed stream which is selected by the first switch 23. When the multiplexed stream reproduced from the stream data reproducing section 100 is scrambled by CSS, the first stream decoder 102 descrambles the input multiplexed stream and then decompresses the stream. In this case, however, the first stream decoder 102 has to be provided with a CSS descrambler.

Meanwhile, when the encrypted multiplexed stream is reproduced from the DVD, a control signal which instructs decryption is input through the terminal 22. According to this control signal, the first switch 23 switches to the contact point S0 to select the output from the decryption section 101. The second switch 24 switches to the contact point S1 to select the output from the stream converter 11.

The multiplexed stream decrypted by the decryption section 101 is automatically input to the stream analyzer 10 and stream converter 11 to alter the video information. Subsequent operations are the same as those described in the first embodiment of the present invention.

As described above, according to the present embodiment, the decryption section 101, the stream analyzer 10 and the stream converter 11 are integrated, and formed with the switches 23 and 24 so as not to be isolated. Thus, there can be provided the AV reproducing apparatus which can reduce the number of data bus lines (bus lines shown by thick solid lines in FIG. 4) through which decrypted multiplexed stream flow, improve security, and facilitate substrate designing.

Although the present invention has been described in connection with specified embodiments thereof, many other modifications, corrections and applications are apparent to those skilled in the art. Therefore, the present invention is not limited by the disclosure provided herein but limited only to the scope of the appended claims.

The present disclosure relates to subject matter contained in Japanese Patent Application No. 2002-189322, filed on Jun. 28, 2002, which is expressly incorporated herein by reference in its entirety.

What is claimed is:

1. An information reproducing apparatus comprising:
   a reproducing section operable to reproduce multiplexed data in which first information which is and a plurality of channels of second information which is compressed and encrypted are multiplexed, the second information being reproduced in synchronization with the first information;
   a decryption section operable to decrypt the reproduced data from the reproducing section;
   a first decoder operable to decompress the decrypted data from the decryption section;
   an analyzer operable to analyze the decrypted data from the decryption section to detect the first information;
   a conversion section operable to alter at least a part of the first information contained in the decrypted data from the decryption section based on an analysis result by the analyzer; and
   second to n-th (n is a natural number, n>1) decoders operable to receive the altered data from the conversion section and decompress the respective channels of second information.

2. The information reproducing apparatus according to claim 1, further comprising
   a first switch operable to switch a data path such that the reproduced data from the reproducing section bypasses the decryption section and is input to the first decoder when a predetermined control signal is input, otherwise, the reproduced data from the reproducing section is input to the decryption section, and
   a second switch operable to switch a data path such that the reproduced data from the reproducing section is input to each of second to n-th decoders when the control signal is input, otherwise, the data from the conversion section is input to each of second to n-th decoders.

3. The information reproducing apparatus according to claims 2, wherein the decryption section, analyzer, conversion section, first switch and second switch are integrated so as not to be isolated.

4. The information reproducing apparatus according to claim 1, wherein the conversion section does not alter time information necessary for synchronized reproduction of the first and second information.

5. The information reproducing apparatus according to claim 1, wherein the conversion section changes a data region to be altered based on predetermined data length information in a multiplexed unit.

6. The information reproducing apparatus according to claim 1, wherein the conversion section replaces data to be altered with data uncorrelated to the data to be altered.

7. The information reproducing apparatus according to claim 1, wherein the multiplexed data is a data stream.

8. The information reproducing apparatus according to claim 2, wherein the multiplexed data is a data stream.

9. The information reproducing apparatus according to claim 3, wherein the multiplexed data is a data stream.

10. The information reproducing apparatus according to claim 4, wherein the multiplexed data is a data stream.

11. The information reproducing apparatus according to claim 5, wherein the multiplexed data is a data stream.

12. The information reproducing apparatus according to claim 6, wherein the multiplexed data is a data stream.

13. The information reproducing apparatus according to claim 1, wherein either one of the first and second information is video information and the other is audio information.

14. The information reproducing apparatus-according to claim 2, wherein either one of the first and second information is video information and the other is audio information.

15. The information reproducing apparatus according to claim 3, wherein either one of the first and second information is video information and the other is audio information.

16. The information reproducing apparatus according to claim 4, wherein either one of the first and second information is video information and the other is audio information.

17. The information reproducing apparatus according to claim 5, wherein either one of the first and second information is video information and the other is audio information.

18. The information reproducing apparatus according to claim 6, wherein either one of the first and second information is video information and the other is audio information.

19. An information reproducing apparatus comprising:
a reproducing section operable to reproduce a multiplexed stream in which compressed and encrypted video information and a plurality of channels of compressed and encrypted audio information are multiplexed;
a decryption section operable to decrypt the multiplexed stream reproduced by the reproducing section;
a first decoder operable to decompress the video information and one channel of audio information contained in the multiplexed stream decrypted by the decryption section;
a management information embedding section operable to embed video management information into the video data decompressed by the first decoder;
a video output section operable to generate a reproduction video signal from the video data embedded with the video management information by the management information embedding section;
a first audio output section operable to generate a reproduction audio signal from the audio data decompressed by the first decoder;
a stream analyzer operable to analyze the multiplexed stream decrypted by the decryption section to detect the video information;
a stream conversion section operable to alter at least a part of the video information contained in the multiplexed stream decrypted by the decryption section based on an analysis result from the stream analyzer;
second to n-th (n is a natural number, n>1) decoders operable to receive the altered multiplexed stream from the conversion section and decompress the respective channels of audio information; and
second to n-th audio output sections operable to generate reproduction audio signals from audio data decompressed by the corresponding audio decoders.

20. The information reproducing apparatus according to claim 19, further comprising
a first switch operable to switch a data path such that the reproduced data from the reproducing section bypasses the decryption section and is input to the first decoder when a predetermined control signal is input, otherwise, the reproduced data from the reproducing section is input to the decryption section, and
a second switch operable to switch a data path such that the reproduced data from the reproducing section is input to each of second to n-th decoders when the control signal is input, otherwise, the data from the stream conversion section is input to each of second to n-th decoders.

21. The information reproducing apparatus according to claim 20, wherein the decryption section, analyzer, stream conversion section, first switch and second switch are integrated so as not to be isolated.

22. The information reproducing apparatus according to claim 19, wherein the stream conversion section does not alter time information necessary for synchronized reproduction of video and audio information.

23. The information reproducing apparatus according to claims 19, wherein the stream conversion section changes a data region to be altered based on predetermined data length information in a multiplexed unit.

24. The information reproducing apparatus according to claims 19, wherein the stream conversion section replaces data to be altered with data uncorrelated to the data to be altered.

* * * * *

UNITED STATES PATENT AND TRADEMARK OFFICE
CERTIFICATE OF CORRECTION

PATENT NO. : 7,184,552 B2
APPLICATION NO. : 10/606997
DATED : February 27, 2007
INVENTOR(S) : Nobukatsu Okuda et al.

It is certified that error appears in the above-identified patent and that said Letters Patent is hereby corrected as shown below:

IN THE CLAIMS
1. In patent column 12, line 58, "claims 2" should read --claim 2--.
2. In patent column 14, line 43, "claims 19" should read --claim 19--.
3. In patent column 14, line 43, "claims 19" should read --claim 19--.

Signed and Sealed this

Twenty-eighth Day of August, 2007

JON W. DUDAS
*Director of the United States Patent and Trademark Office*